United States Patent [19]

Pezza

[11] 3,774,471
[45] Nov. 27, 1973

[54] CONTROL PEDAL FOR MOTOR VEHICLES
[75] Inventor: Salvatore Pezza, Milan, Italy
[73] Assignee: Alfa Romeo S.p.A., Milan, Italy
[22] Filed: Apr. 3, 1972
[21] Appl. No.: 240,750

[30] Foreign Application Priority Data
Apr. 2, 1971 Italy .............................. 21380 B/71

[52] U.S. Cl. ................................................. 74/560
[51] Int. Cl. ............................................ G05g 1/14
[58] Field of Search ...................... 74/560, 519, 517, 74/512, 100, 97

[56] References Cited
UNITED STATES PATENTS
3,236,120  2/1966  Fender ............................. 74/512 X FOREIGN PATENTS OR APPLICATIONS
1,931,356  12/1970  Germany .............................. 74/560

Primary Examiner—Charles J. Myhre
Assistant Examiner—F. D. Shoemaker
Attorney—John C. Holman et al.

[57] ABSTRACT

A resilient unit for biasing the control pedals (such as the friction clutch pedal and/or the brake pedal) of a motor vehicle in which the pedal biasing unit proper is a substantially complete convolution of steel wire, lying on a plane perpendicular to the axis of the pedal pivotal axis. The configuration of the resilient unit is such as to assist the driver both when depressing the pedal and when releasing the pedal, so that the physical effort required of the driver is in any case reduced.

3 Claims, 2 Drawing Figures

PATENTED NOV 27 1973   3,774,471

CONTROL PEDAL FOR MOTOR VEHICLES

BACKGROUND OF THE INVENTION

This invention relates to a control pedal for motor vehicles, which equipped with a yieldingly deformable member adapted to diminish the force to be imparted by the driver for depressing the pedal and for having the pedal to be brought back to the starting position.

In order to actuate the motor vehicle pedals, considerable forces are required, which, however, should not be exceedingly high for a person of normal build. Among the factors which causes tiredness for the driver is to be obliged to impress such forces frequently, as occurs when driving downtown or during particular maneuvers, such as parking maneuvers, during which the driver virtually continually depresses and releases the pedals.

The approaches which provide for automatic mechanisms are too expensive for certain types of motor vehicles and, sometimes, are not appreciated by the motorists since they suppress the pleasure of driving the car, as the latter becomes virtually a self-driving unit.

PRIOR ART

A solution to this problem is known, which permits to fulfil these contrasting requirements and which consists in applying to the pedal resilient means which, by their agency, assist the muscular force of the driver as he depresses the pedal or, as an alternative, when he allows the pedal to revert to the rest position, so that the maneuvers are directed by the driver, but the effort which is required to effect these operations is partly supplied by the driver and partly by the elastic energy which has been stored by the resilient means as applied to the pedal.

The conventional mechamisms are equipped with springs which act by torsional twist or by bending, and which are pivoted for rotation both to the pedal arm and to a point fixed in space in the vehicle. As the pedal, by being rotated about its pivotal point, has gone past a position, which is called "load inversion position" or "dead center position", in which the pivot is aligned both with the point at which the spring is affixed to the arm and to the point at which the spring is fastened to the vehicle body, the forces as generated by the spring show a tendency to rotate the pedal about its pivotal point, in the direction of pedal depression until attaining the end of stroke position, or, as an alternative, until the pedal is brought back to its rest position again.

These conventionally known mechanisms involve bulk problems which are difficult to solve, due to space shortage in the vicinity of the pedals, especially in motor cars, so that one is often compelled to give up their adoption.

SUMMARY OF THE INVENTION

The pedal, subject of the present invention, which has been designed with a view of eliminating the above indicated shortcomings, while simultaneously affording an economically acceptable solution, is equipped with a resiliently deformable member, whose construction is quite particular but simple, having a configuration which is not bulky as itself and such that the resilient element can be adequately proportioned without requiring too roomy a space, and which is capable of offering an appreciable work while withstanding the stresses to which it is subjected. The above indicated resiliently deformable element is defined by a single substantially complete convolution of steel, having a circular cross-sectional shape and pivotally connected at one end to the vehicle body and, at the opposite end, to the pedal arm (preferably between the pivotal point and the pedal plate in order to obtain a more compact structure, but also on an extension of the arm, whenever sufficient space is available under the hood).

The above indicated element is, of course, preloaded as a function of the work to be supplied thereby and is arranged at an appropriate location relative to the pedal according to the direction of the displacement to be effected by the pedal.

A preferred embodiment of the invention is shown diagrammatically in the accompanying drawing, given by way of nonlimiting example.

BRIEF DESCRIPTION OF THE INVENTION

The numeral 1 indicates the pedal plate, on which the driver's foot rests, with the plate being integral with an arm 2 which is pivoted for rotation to a pin 3 which is affixed, in the example shown, to a pedal box 4.

Figure 1:
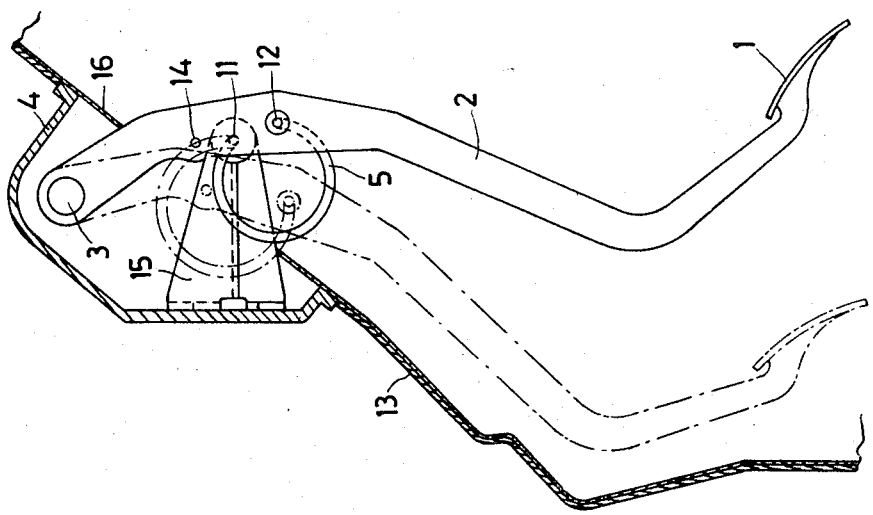
FIG. 1 shows a side elevational view of the pedal.
Figure 2:
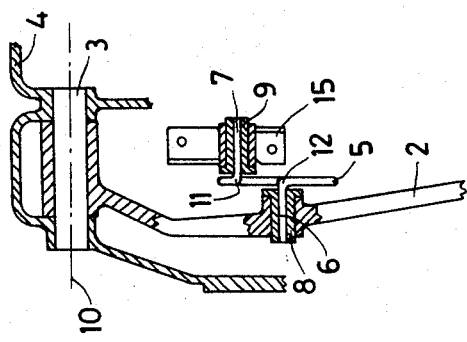
FIG. 2 is a front view of a portion of the pedal in cross-section.

Integral with the pedal arm 2 there are the members (not shown since they are not within the field of the present invention) which, through a leverage, or, as an alternative, through a hydraulic circuitry, control, for example, the friction clutch or the brakes of the vehicle. FIG. 1 shows hole 14 which permits such a connection to be effected.

At 5 there is indicated the resilient member which consists of a substantially complete steel convolution, lying on a plane perpendicular to the axis 10 of the pin 3. At 11 there is indicated the end point of the spiral in correspondence with which the steel wire forming the resilient member is bent so as to form an arm 7, which is rotatably pivoted to a bushing 9. The bushing is solid with a supporting tag 15, with the tag being affixed to the pedal box 4 and numeral 12 indicates the end point of the spiral in correspondence with which the wire forming the resilient member is bent to form an arm 6, which is pivoted for rotation to a bushing 8. The bushing 8 is integral with the pedal arm 2, inasmuch as the arm 6 of the resilient member is connected to the pedal arm 2 at a point midway between the pivot (axis 10) and the plate 1.

The box 4 is fastened with conventional means to the sheet metal of a dashboard 13 which, in the vicinity of the pedal, has a perforation 16 permitting the pedal to emerge therefrom. In the case in point, as the resilient member 5 is positioned with respect to the pedal as shown in the drawings, when the driver depresses the pedal, during a first portion of the stroke, he must overcome the bias of the resilient means applied, for example, to the friction clutch or to the brakes, which counteract the pedal depressing force and, in addition, also the bias of the resilient member 5 which tends to lift the pedal in the rest position, until the pedal, under the driver push, attains the load inversion position (dead center), a position where the axis of the pin 3 is aligned with both the axis of the arm 6 and with that of the arm 7, in the sense that both these axes lie on a single plane which is perpendicular to the plane of the drawing FIG. 1. Beyond the position aforementioned, the resilient member 5 imparts to the pedal a force directed in the same direction as the force impressed by the driver, so that, of the work necessary to depress the pedal fully, a portion is supplied by the driver and a portion by the resilient member aforementioned, which, by being still moved on the plane perpendicular to the axis 10 of the pedal pin 3, is brought to the position shown in chain dotted lines in FIG. 1, corresponding to the position in which the pedal is fully depressed (also shown in FIG. 1 in chain dotted lines).

During the pedal return stroke, up to the position of load reversal (dead center) the resilient member 5 acts contrarywise with respect to the direction of movement and the pedal is pushed so as to return to the rest position by the resilient means, as applied, in the manner recalled above, either to the friction clutch or to the brakes, and which are no longer hindered by the driver's action, and, conjointly, by the pedal-biasing resilient means.

In the last portion of the return stroke, once the load inversion position has been overcome, the resilient member 5 acts upon the pedal in the same direction as the resilient means of the friction clutch or the brakes and tends to bring the pedal back to the rest position.

Springs are often applied to the pedal arm in order to ensure that the pedal is brought back to the rest position and is held fully lifted.

The resilient member 5 can assist, or even replace, the springs aforementioned, since it is capable of impressing, in the last portion of the return stroke, a pull towards the rest position of the pedal, in the sense of keeping it lifted. Also the torsion or bending springs applied to the pedal in the conventional structures, fulfil this requirement, but the advantage stemming from the solution suggested above is apparent as regards the reduction of bulk, the more so that in a few cars space shortage does not allow the introduction of the conventional kinds of torsion or bending springs in order to assist the driver's force.

What is claimed is:

1. A control pedal for motor vehicles including a pedal arm having opposite ends. A pivot for one end of the pedal arm for attachment to the vehicle frame, a pedal plate carried by the other end of the pedal arm, a support means located laterally with respect to the pedal arm, and a preloaded resilient deformable member operatively connected to the support means and the pedal arm serving to diminish the force to be imparted by a driver for depressing the pedal plate and for causing the pedal plate to return to its starting position, said resilient deformable member comprising a single substantially complete convolution of steel having a circular cross-sectional outline, said convolution lying on a plane perpendicular to the axis of the pivot for the pedal arm and having two end points, means rotatably pivoting one end point to the support means, and means rotatably pivoting the other end point to the pedal arm.

2. The control pedal for motor vehicles as claimed in claim 1 in which each end point is defined by an arm extending normal to the plane of the convolution, one arm extending toward the support means and the other arm toward the pedal arm, and a bushing in each of said support means and pedal arm in which said one arm and said other arm are received respectively.

3. The control pedal for motor vehicles as claimed in claim 1 in which said other end point is rotatably pivoted to the pedal arm intermediate the pedal plate and the pivot for the pedal arm.

* * * * *